June 23, 1959 G. A. NEFF 2,892,182

REGISTER FOR DIGITAL INFORMATION

Filed Feb. 1, 1954 3 Sheets-Sheet 1

INVENTOR.
GLYN A. NEFF

BY James B. Christie

ATTORNEY

REGISTER FOR DIGITAL INFORMATION

Filed Feb. 1, 1954

INVENTOR.
GLYN A. NEFF
BY James B. Christie
ATTORNEY

June 23, 1959 G. A. NEFF 2,892,182

REGISTER FOR DIGITAL INFORMATION

Filed Feb. 1, 1954 3 Sheets-Sheet 3

INVENTOR.
GLYN A. NEFF
BY James B. Christie
ATTORNEY 2,892,182
Patented June 23, 1959

2,892,182

REGISTER FOR DIGITAL INFORMATION

Glyn A. Neff, Pasadena, Calif., assignor, by mesne assignments, to Consolidated Electrodynamics Corporation, Pasadena, Calif., a corporation of California Application February 1, 1954, Serial No. 407,346
5 Claims. (Cl. 340—173)

This invention relates to improved apparatus for registering digital information, and more particularly to apparatus including combined coincidence and storage means for registering digital information.

In the field of data processing, frequently it is desirable to convert sequentially occurring digital information, i.e., digital information occurring digit-after-digit, to a substantially simultaneous form. Predermined quantities of the sequentially occurring digital information are sometimes referred to as "blocks" of information. One method for such conversion includes temporarily storing a block of information on a recirculating storage means and energizing selected portions of a storage register which is commutated synchronously with the position of the recirculating storage means so that digital information is registered in the storage register in accordance with its position in the recirculating storage means. A system in which sequentially occurring digital informaiton is reduced to substantially simultaneous form in accordance with the above is shown and described in the co-pending United States patent application of Robert L. Sink and Glyn A. Neff, Serial No. 402,126, filed January 4, 1954, and entitled "Data Processing Apparatus."

The present invention provides an improved storage register which may be used in conjunction with the apparatus of the aforementioned co-pending application whereby the functions of establishing coincidence between signals for registration, and the function of registering the condition shown by such coincidence are combined in a single electron tube and associated circuitry for each selected portion of the storage register.

In addition, the present invention is directed to apparatus for effectively commutating a plurality of combined coincidence and storage register circuits whereby sequentially occurring digital information may be transmitted to a remote location and registered by means of a total of only two signal transfer lines.

In one embodiment, my invention may be used in connection with card punching apparatus for recording the digital information appearing in the combined coincidence circuits and storage register in the form of perforations in a card.

In accordance with my invention, a plurality of combined coincidence and storage circuits are commutated so as to selectively enable each of the combined coincidence and storage circuits to respond to digital information transferred to all of the combined coincidence and storage circuits over a common signal transfer line. In particular, each of the combined coincidence and storage circuits comprises an electron tube of a type which is adapted to be rendered conducting by a change in bias between one or more control electrodes and a cathode, and which is further adapted to maintain itself conducting without reference to further changes in biasing potential until such time as the anode to cathode potential is reduced to render the electron tube non-conducting.

A commutating means selectively places each of the electron tubes in a condition where a signal applied to the electron tubes renders the conditioned electron tube conducting. The commutation and coincidence process continues until a selected amount of digital information is registered by the conditions of conduction of the electron tubes. In order to reset the electron tubes so as to enable them to respond to a subsequent quantity of digital information, I provide a reset electron tube which is adapted, upon receiving a reset signal, to lower the potential on the anodes of all of the combined coincidence and registering electron tubes so as to render them nonconducting.

In one embodiment, where the apparatus is to be used in conjunction with auxiliary recording means, such as card punching apparatus, I include a relay in the cathode circuit of each of the combined coincidence and registering electron tubes which is adapted to close a pair of contacts when its associated electron tube is conducting, thereby providing an electrical signal transfer path which is capable of carrying an amount of power in excess of that which each electron tube is capable of carrying.

The combined coincidence and registering circuit included in my apparatus may be used separately from the aforementioned commutating means. A single one of the circuits may be employed as a coincidence circuit where it is desired to supply an output signal over a period of time in response to the coincidence of two input signals.

Other features of advantage of my invention will become apparent upon a reading of the following specification and an inspection of the drawings in which.

Figure 1:
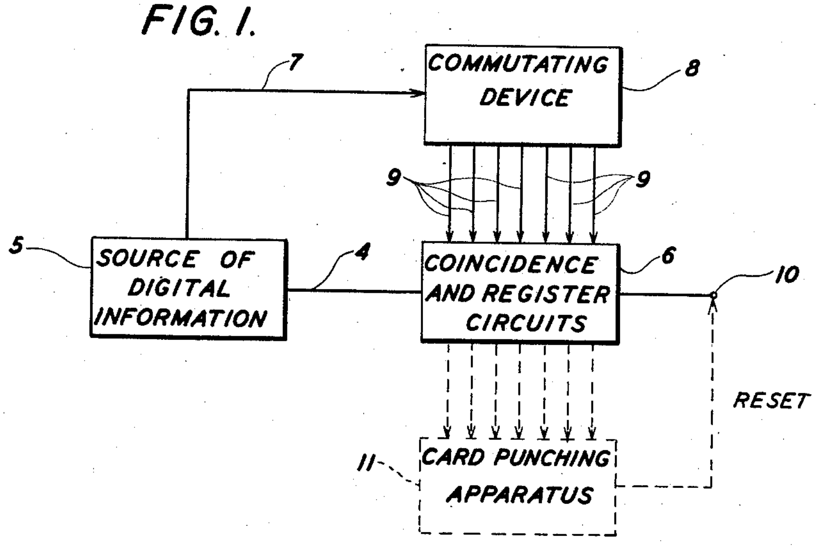
Fig. 1 is a simplified block diagram of one embodiment of my invention.

Turning in detail to Fig. 1, a source of digital information 5 is adapted to provide electrical signals representing sequentially occurring digital information digit-after-digit on lead 4. In the embodiment of Fig. 1, the digital information supplied by the source of digital information 5 is binary in character, i.e., the signal is capable of representing two values of digital information sometimes termed "0" and "1." In addition, the source of digital information 5 is adapted to provide an electrical pulse on the lead 7 for each of the digits supplied to the coincidence and register circuits 6.

A commutating device 8 is adapted to respond to the pulses appearing on the lead 7 and to energize each of the output leads 9 in sequence. Although any desired sequence of commutation may be employed, assuming the sequence to be one after another from left to right, the coincidence and register circuits 6 will be energized in sequence from left to right.

Each of the coincidence and register circuits 6 is adapted to respond to the condition where a digit is supplied from the source of digital information 5 and it is energized from its associated one of the leads 9 so as to register the digit supplied from the source of digital information 5. In addition, each of the combined coincidence and register circuits 6 is adapted to maintain its particular registration, if any, until a reset pulse is applied to a terminal 10.

A card punching apparatus 11 may be coupled to the coincidence and register circuits 6 so as to record the registrations appearing therein. After a particular registration is recorded, a reset pulse may be supplied by the card punching apparatus 11 to the terminal 10 so as to return the coincidence and register circuits 6 to their initial condition whereby they are capable of sensing and registering a subsequent quantity of digital information.

Figure 2:
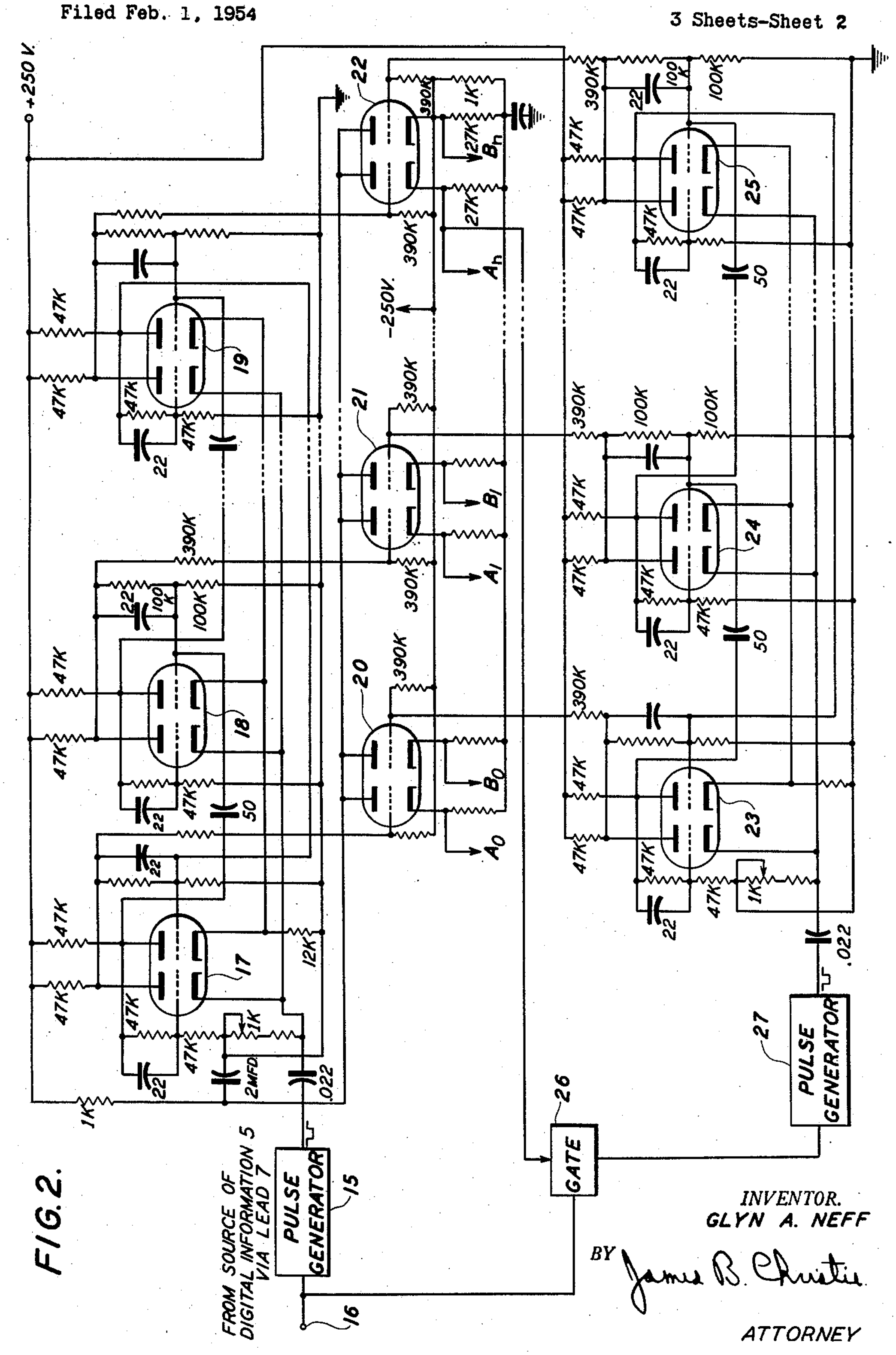
Fig. 2 is a schematic circuit diagram of a counter which may be used in connection with matrixing circuits as the commutating device of Fig. 1.

Fig. 2 shows one form of counter which may be used in conjunction with matrixing circuits for providing the function of the block labeled commutating device 8 of Fig. 1. It will be appreciated that other types of commutating devices might be employed as well.

The pulses from the source of digital information 5 which are supplied on lead 7 may be applied to a pulse generator 15 via a terminal 16. The pulse generator 15 is adapted to provide an output pulse of a desired wave shape for driving a counting circuit, as for example a ring-type counting circuit. In this embodiment, the output pulses from the pulse generator 15 are employed to energize and shift the condition of operation of a ring counter by one step for each pulse. This is accomplished by applying the pulses to the cathodes of the electron tubes 17, 18 and 19. It will be noted that the connections between the electron tube 18 and the electron tube 19 are broken. This indicates that an additional number of sections identical to those shown may be included. Since ring-type counters are well-known in the art, no further explanation of the actual circuitry is considered to be necessary except to say that any particular counter employed should have a suitable number of stable states. In each of the stable states, the output signal from a particular section may be applied to a cathode follower electron tube, as for example electron tubes 20, 21 and 22. Thus, when the ring counter is in one condition, a signal is supplied on the lead $A_0$. When the next pulse is applied to the pulse generator 15, a signal appears on the lead $A_1$ across the cathode resistance of the electron tube 21. Upon the arrival of each pulse from the pulse generator 15, the ring counter advances a succeeding step until the last stable state is reached when a signal appears on the lead $A_n$. At this time the sequence repeats itself starting with a signal on the lead $A_0$. The portion of the circuitry thus far described will count from 0 to $n$.

In order to achieve counts of higher numbers, an additional ring-type counter, including the electron tubes 23, 24 and 25, may be employed. When the ring counter of electron tubes 17, 18 and 19 reaches that state where a signal is supplied on the lead $A_n$, a gate 26 is enabled to pass the next succeeding pulse applied to the terminal 16. This pulse may be reinforced by a pulse generator 27 for providing a desired pulse wave shape, and in turn the output pulse from the pulse generator 27 energizes the ring counter, including the electron tubes 23, 24 and 25. As previously, additional sections may be included between the electron tubes 24 and 25 so that the ring counter has a total of $n'+1$ stable states (the additional 1 added to $n'$ accounts for the "0" condition of operation). This means that the circuitry shown in Fig. 2 as a whole can achieve a total count of $(n+1)(n'+1)$.

Each of the sections of the last named ring counter may be connected to a cathode follower output so as to provide a signal on $B_0$ when the counter is in one condition of operation, a signal on $B_1$ when the counter is in the next successive condition of operation and so on.

The total number of stable states of the apparatus of Fig. 2 preferably should correspond to the total number of digits in a given block of digital information to be registered. Thus, the condition of the apparatus of Fig. 2 determines the relative position of any given digit supplied by the source of digital information 5 with respect to the beginning and end of a block of information.

Figure 3:
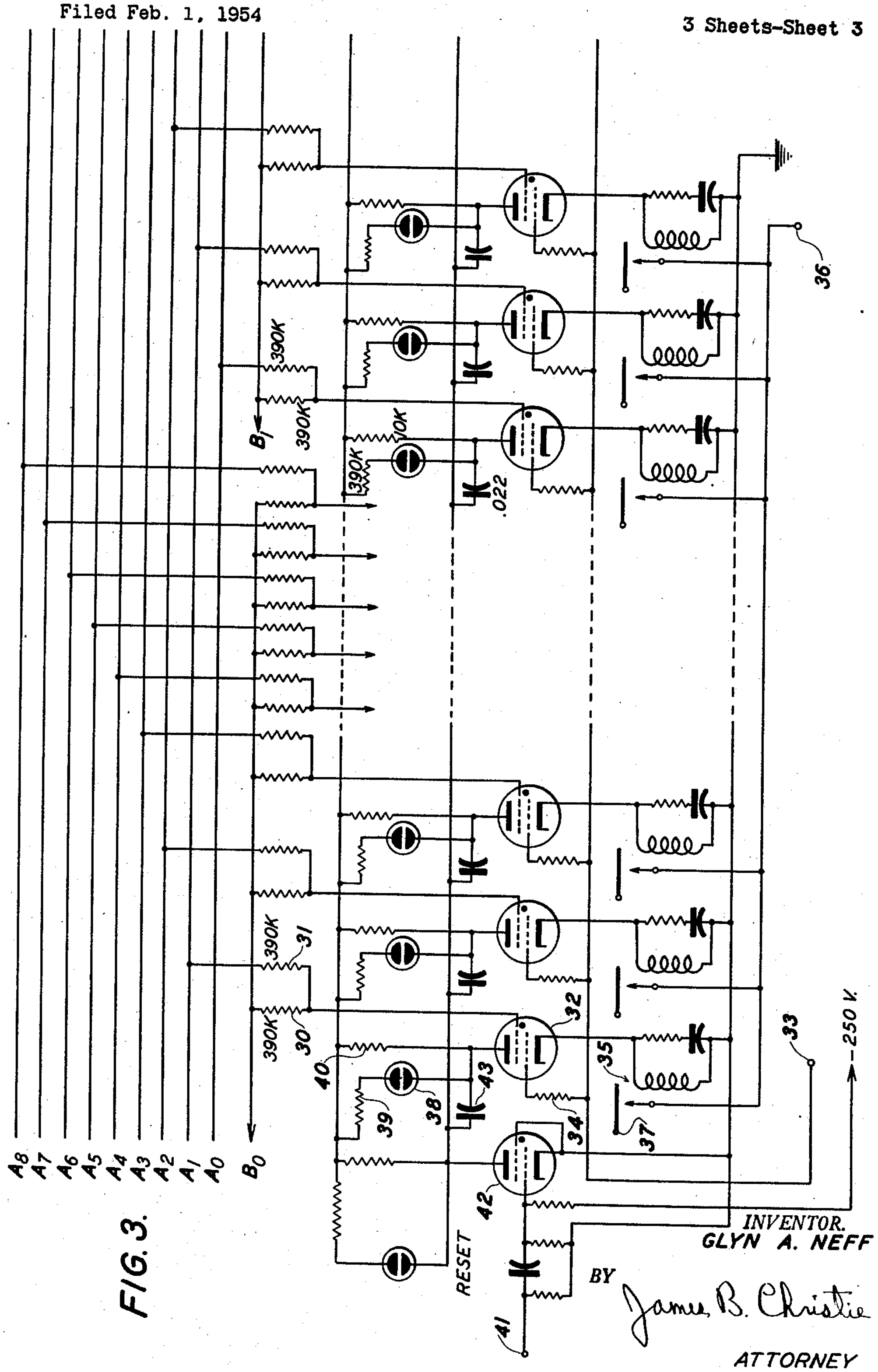
Fig. 3 is a schematic circuit diagram of one form of matrixing circuits and combined coincidence and registering circuits for use in the embodiment of Fig. 1.

Referring to Fig. 3, one form of apparatus for providing the functions of the coincidence and registering circuits 6 of Fig. 1, along with suitable resistor matrixing circuits for adapting the counter of Fig. 2 to provide commutation of the coincidence and registering circuits, is shown. Each of the leads $A_0$ through $A_n$ and $B_0$ through $B_n$ may be connected to the corresponding lead shown in Fig. 2. Although only the matrixing circuits for the signal outputs from the circuitry of Fig. 2 appearing on leads $B_0$ and a portion of $B_1$ have been shown in Fig. 3, it will be appreciated that additional identical circuitry may be included for leads $B_1$ through $B_n$.

The matrixing circuits comprise a plurality of pairs of resistors which are connected so as to add algebraically the signals appearing on a selected one of the leads $A_0$ through $A_n$ and one of the leads $B_0$ through $B_n$. Thus, when the counter of Fig. 2 is in that condition of operation where a signal is supplied on the lead $B_0$ and the lead $A_1$, the resistors 30 and 31 add these two signals and apply them to the screen grid of a suitable electron tube, such as a thyratron 32.

Thyratron tubes are one suitable type of electron tube for providing a combination coincidence circuit and storage resister in accordance with my invention. Although only six such thyratrons (omitting the reset thyratron 42) have been shown, identical circuitry may be employed for as many additional combination coincidence and register circuits as desired.

The action of a thyratron is such that once it is rendered conducting by a change of control electrode potential, a further change in control electrode potential will be ineffective to render the electron tube non-conducting. However, by reducing the anode to cathode potential, a thyratron may be rendered non-conducting.

Digits from the source of digital information 5 appearing on the lead 4 may be applied to a terminal 33 of Fig. 3 by means of a grid resistor 34 which is connected between the control electrode of the thyratron 32 and the terminal 33. The signals from the terminal 33 are applied in like manner to all of the thyratrons, but since the operation of each individual thyratron and its associated circuitry is identical to that of the thyratron 32, only the operation of the thyratron 32 will be discussed. When a signal appears on the control electrode of the thyratron 32 and the algebraic sum of the signals provided by means of the matrixing circuit, including the resistances 30 and 31, reach a certain level, the thyratron 32 will be rendered conducting. No further change of potential on either the first control electrode or the second control (shield) electrode will be sufficient to cut the electron tube 32 off. Thus, whenever such a coincidence is established, the thyratron 32 is capable of sensing the coincidence and registering an output signal for a period of time which is not determined by the coincidence time.

It will be appreciated that the matrixing circuits effectively provide a commutation process in which each of the thyratrons is placed in turn in a condition where a signal applied to the terminal 33 at the same time renders it conducting. The particular thyratron which is energized at any particular instant corresponds to the relative position of the digit from the source of digital information 5 with respect to the total block of digital information.

When the thyratron 32 is rendered conducting, a relay 35 connected in the cathode circuit is energized so as to close the contacts of the relay and effectively provide a closed circuit between the terminal 36 and the terminal 37.

For purposes of providing a visual registration of those thyratrons which are conducting, a gas discharge tube, such as a neon tube 38, may be connected serially with a resistance 39 in parallel with the load resistance 40 of the thyratron 32.

After an entire block of information has appeared at the terminal 33 and all of the thyratrons have been energized, the registration of the block of information appearing as conditions of conduction in the thyratrons of Fig. 3 may be recorded in permanent form by means of the card punching apparatus 11 of Fig. 1. Individual punches in the card punching apparatus 11 may be energized in accordance with the particular relays of Fig. 3 which are closed so that the block of information is recorded in a row on a conventional punched card.

At the end of the punching operation and in order to proceed to the next block of information, it is necessary to reset the registering thyratrons of Fig. 3. This is accomplished by applying a reset pulse derived from the card punching apparatus 11 to a terminal 41, and hence to the control electrode of a reset device, such as the thyratron electron tube 42. This causes the potential at the anode of the reset thyratron 42 to decrease, thereby providing a negative signal at the anode of each of the registering thyratrons 32 via a suitable coupling capacitance 43 to render the thyratron 32 non-conducting. The apparatus is then in condition for another commutation process in which the next succeeding block of information supplied by the source of digital information 5 may be registered.

I claim:

1. A combined coincidence and storage register comprising in combination, a plurality of combined coincidence and registering circuits, each of which includes a thyratron tube having at least a cathode, an anode and two control electrodes, means coupling corresponding ones of the control electrodes of all of said thyratron tubes for commutating each of said thyratron tubes in sequence, a digital information input circuit coupled to the other of said control electrodes of all of said thyratron tubes whereby digital information may be applied simultaneously to each of the thyratron tubes, each of said thyratron tubes being adapted to be rendered conducting when coincidence occurs between said digital input signal and the signal supplied by said commutating means, a relay coupled to each of said thyratron tubes which is adapted to be energized when its associated thyratron tube is rendered conducting, and reset means coupled to all of said combined coincidence and registering circuit thyratron tubes for rendering all of said thyratron tubes non-conducting.

2. Apparatus in accordance with claim 1 in which said reset means comprises a reset thyratron tube coupled in parallel with all of said combined coincidence and registering circuit electron tubes, said reset thyratron tube being adapted to be rendered conducting in response to a reset signal.

3. Apparatus for registering a quantity of digital information appearing digit-after-digit in time sequence comprising in combination, a plurality of combined coincidence and registering circuits, each of which includes a thyratron electron tube having at least a cathode, an anode and two control electrodes, a counter for counting each of the digits of said quantity of digital information to be registered, a matrixing circuit coupled between said counter and one of the control electrodes of all of said thyratron tubes whereby each of said thyratron tubes is sequentially energized, a common input circuit coupled to the other of said control electrodes of all of said thyratron tubes whereby digital information may be applied simultaneously to all of said thyratron tubes, each of said thyratron tubes being adapted to be rendered conducting when sequentially energized and a digital signal is applied thereto, a plurality of relays each of which is coupled between the anode and cathode of one of said combined coincidence and registering circuit thyratron tubes, and reset means coupled to all of said combined coincidence and registering circuit electron tubes for rendering all of the thyratron tubes non-conducting.

4. Apparatus in accordance with claim 3 in which said reset means comprises a thyratron electron tube coupled in parallel with all of said combined coincidence and registering circuit thyratron tubes, said reset thyratron tube being adapted to be rendered conducting in response to a reset signal.

5. Apparatus including the combination of a source of digital information adapted to provide a quantity of digital information digit-after-digit in time sequence, said source of digital information also being adapted to provide a pulse corresponding to each of the digits of said quantity of digital information, a counter coupled to said source of digital information for counting each of said pulses, a plurality of combined coincidence and registering circuits, each of said circuits including a thyratron tube having at least a cathode, an anode, and two control electrodes, the thyratron tube being adapted to be rendered conducting by changing the potential between said control electrode and said cathode, matrixing means coupled between said counter and said plurality of coincidence and registering circuits including means coupling said matrixing means with one of said control electrodes of each of the thyratron tubes, means coupling the digital information to all of said plurality of coincidence and registering circuits including means for coupling said source of digital information to another of said control electrodes of each of the thyratron tubes whereby each of the said thyratron tubes is rendered conducting when coincidence is established between the signal provided by said matrixing circuit and the signal provided by said source of digital information.

References Cited in the file of this patent

UNITED STATES PATENTS

| | | |
|---|---|---|
| 2,425,307 | Desch et al. | Aug. 12, 1947 |
| 2,434,989 | Christian | Jan. 27, 1948 |
| 2,503,127 | Mumma | Apr. 4, 1950 |
| 2,554,886 | Stedman | May 29, 1951 |
| 2,556,614 | Desch | June 12, 1951 |
| 2,609,451 | Hanson | Sept. 2, 1952 |
| 2,696,599 | Holbrook et al. | Dec. 7, 1954 |
| 2,709,771 | Dehn | May 31, 1955 |